United States Patent [19]
Shirley et al.

[11] Patent Number: 5,737,739
[45] Date of Patent: Apr. 7, 1998

[54] SYSTEM THAT ACCESSES A KNOWLEDGE BASE BY MARKUP LANGUAGE TAGS

[75] Inventors: Mark H. Shirley, Santa Clara, Calif.; Lawrence Armour, Stantonbury Fields, England; David G. Bell; Daniel G. Bobrow, both of Palo Alto, Calif.; Mark Harmison, Rochester, N.Y.; Daniel S. Marder, Penfield, N.Y.; Olivier Raiman, Paris, France; Kim H. Schwind, Honeoye, N.Y.; Estella M. Verdouw, Walworth, N.Y.; Charles Vorndran, Rochester, N.Y.

[73] Assignee: Xerox Corporation, Stamford, Conn.

[21] Appl. No.: 574,482

[22] Filed: Dec. 19, 1995

[51] Int. Cl.$^6$ .................... G06F 17/00; G03G 21/00
[52] U.S. Cl. .................... 707/512; 395/54; 399/11
[58] Field of Search .................... 395/774, 776–778, 395/762, 50, 51, 54, 614, 615; 399/8–12, 81

[56] References Cited

U.S. PATENT DOCUMENTS

| | | | |
|---|---|---|---|
| 4,591,983 | 5/1986 | Bennett et al. | 395/65 |
| 4,648,044 | 3/1987 | Hardy et al. | 395/76 |
| 4,658,370 | 4/1987 | Erman et al. | 395/76 |
| 4,713,775 | 12/1987 | Scott et al. | 395/50 |
| 4,783,752 | 11/1988 | Kaplan et al. | 395/64 |
| 4,839,822 | 6/1989 | Dormond et al. | 128/630 |
| 4,924,408 | 5/1990 | Highland | 395/50 |
| 4,943,932 | 7/1990 | Lark et al. | 395/76 |
| 4,985,857 | 1/1991 | Bajpai et al. | 364/551.01 |
| 5,057,866 | 10/1991 | Hill, Jr. et al. | 399/8 |
| 5,138,377 | 8/1992 | Smith et al. | 399/11 |
| 5,185,698 | 2/1993 | Hesse et al. | 395/793 |
| 5,228,116 | 7/1993 | Harris et al. | 395/54 |
| 5,239,547 | 8/1993 | Tomiyama et al. | 399/9 |
| 5,273,434 | 12/1993 | Peck | 434/224 |
| 5,274,801 | 12/1993 | Gordon et al. | 395/603 |
| 5,291,602 | 3/1994 | Barker et al. | 395/786 |
| 5,295,067 | 3/1994 | Cho et al. | 395/229 |
| 5,325,156 | 6/1994 | Ulinski | 399/8 |
| 5,349,648 | 9/1994 | Handley | 395/779 |
| 5,355,444 | 10/1994 | Chirico | 395/51 |
| 5,365,310 | 11/1994 | Jenkins et al. | 399/8 |
| 5,428,529 | 6/1995 | Hatrick et al. | 395/774 |
| 5,490,089 | 2/1996 | Smith et al. | 399/9 |
| 5,532,920 | 7/1996 | Hartrick et al. | 395/761 |
| 5,539,869 | 7/1996 | Spoto et al. | 395/336 |
| 5,546,502 | 8/1996 | Hart et al. | 395/12 |
| 5,557,549 | 9/1996 | Chang | 364/551.01 |
| 5,636,008 | 6/1997 | Lo Biondo et al. | 399/8 |

FOREIGN PATENT DOCUMENTS

| | | |
|---|---|---|
| 0 333 620 A2 | 9/1989 | European Pat. Off. |
| 0 474 058 A2 | 3/1992 | European Pat. Off. |

OTHER PUBLICATIONS

Article, "Introduction to the SGML Primer" (SoftQuad, Inc. 1995).

The Commercial Computer Program Called "Test Builder™" by the Carnegie Group of Pittsburgh PA. (no date given).

*Primary Examiner*—Joseph R. Burwell
*Attorney, Agent, or Firm*—R. Hutter

[57] ABSTRACT

An expert system, such as could be used for service of a complicated physical device such as a printer or copier, exploits a knowledge base which is written in a markup language format such as SGML. The knowledge base comprises text which, if desired, can be printed out on paper to yield a traditional service manual. In addition to the typical formatting markup language tags surrounding the text of the knowledge base, hierarchical tags are provided in the electronic version of the knowledge base, to define a set of decision trees which can be accessed and navigated by an expert system. A diagnostic advisor can access specific elements of the knowledge base as needed to synthesize optimized diagnosis and repair procedures depending on an entry given by a tech rep servicing a machine. This arrangement thus supports both a printed service manual and a viewer that provides expert diagnostic advice.

19 Claims, 7 Drawing Sheets

```
<TEST TIME=*2.0* ID=*R07001/5* NAME=*Tray 1 Home Latch locks  in home position.*
SETUPS=*R07001/4 * >
Check that the Tray 1 Home Latch locks the Tray in the home position.

</TEST>

<DECL ID=*R07001/6* NAME=*Tray 1 locking is okay. *>
The Tray 1 Home Latch locked Tray 1 in the home position.

</DECL>

<SETUP TIME=*3.0* ID=*R07001/7*>

<PARA>
Enter diagnostics.  Enter the code 07-01.  Pull out Tray 1 to break the Tray 1 link (LK600)

<PARA>

</SETUP>

<TEST TIME=*0.0*  ID=*R07001/8*  NAME=*Observe display for state change. *SETUPS=*R07001/7*
>
Observe the display.

</TEST>

<DECL ID=*R07001/9*  NAME=*State change detected by system. *>
The display changes from 0V to %v.

</DECL>
```

P10-612 DRY INK NOT FIXED (FUSED) RAP

*(16 JUNE 89)*

The purpose of this RAP is to determine/correct the cause of ← DESC
dry ink not fusing properly to the print.

PROCEDURE

The problem occurs only after a cold startup of the machine ← Q
(first 30 prints after power on).
Y    N        /S              /T
   Enter Printer dC701. Check the Fuser roll
   temperature. The Fuser roll temperature is in ← Q
   specification.
   Y   N
                                    CA
   |   Adjust the Fuser roll temperature ←
   Select [Contact Arc Setup]. The contact arc is in ← Q
   specification.           S
   Y   N
   |   Adjust the contract arc (3-A1) ← CA       CA
   Replace the metering blade an the Fuser agent wick ←
   (PL3-D7)
                            /T
Check the machine error log for metering roll undertemperature
faults (P10-210). Metering roll undertemperature faults have
occurred.        /S          ← Q
Y    N
   Enter Printer dC701. Check the metering roll ← T
   temperature. The Metering roll temperature is in
   specification.                              Q
   Y   N
   |   Adjust the metering roll temperature. Ensure   ← CA
   |   that the metering roll heater turns on.
   Replace the Metering Blade and the Fuser agent wick
   (PL3-D7).
                                              CA

*FIG. 6*

<BOOKLET> <FILL> The Document Instance </Fill>
<TEXT> <PARA> The sample document instance which follows contains the text of the document incorporating the markup as specified in the Booklet DTD. </PARA>
<PARA> Why the term <QUOTE> document instance </QUOTE> ? Because we are referring to a particular document which is one instance of many possible documents that could be created in accordance with the Booklet DTD. </PARA>
<PARA> Markup within the document is called <EMPH> discriptive markup </EMPH> . Discriptive markup identifies the elements within the document instance which make up its logical structure. </PARA>
<PARA> Note the tag names for elements in the document instance below are naturally, the names declared as markup in the DTD .... </PARA> </TEXT>
</BOOKLET>

FIG. 7
*(Prior Art)*

SYSTEM THAT ACCESSES A KNOWLEDGE BASE BY MARKUP LANGUAGE TAGS

FIELD OF THE INVENTION

The present invention relates to a method for producing a knowledge base, particularly a knowledge base related to information needed by technical representives servicing complicated machinery such as printers and copiers. Specifically, this method produces the knowledge base in a standard document markup language, such that high quality standard technical documentation can be produced from this knowledge base. A knowledge base produced by this method also supports a viewer that can provide expert diagnostic advice by dynamically reconfiguring parts of the knowledge base.

BACKGROUND OF THE INVENTION

Traditionally, the word "text" has been defined as information rendered in written or printed form. With the computer age, however, it has become possible to speak of text existing in an essentially disembodied form, such as in an electronic memory, within a single computer or accessible over a network. Such electronic text can be viewed by a human user only if displayed on a screen or embodied on a printed page.

One common system for organizing text within a computer memory is "standardized generalized markup language," or SGML. In SGML, specific quantities of text, ranging in length from a short sentence or single word to several pages, are organized as "elements" which can be named and identified. Significantly, in SGML, the different elements, each element being a quantity of prose, can be organized in a hierarchical or "nested" form. For example, in SGML, a "book" can contain a number of "chapters," a "chapter" can include a number of "sections," a "section" can include a number of "paragraphs," and so forth, with the hierarchy of organization going down to the smallest and most specific elements. It is also known to include bitmaps for drawings within a markup language such as SGML, and consider the picture itself an element. Typically, a markup language such as SGML is directed mainly toward providing, ancillary to the substance of the text being printed, additional instructions which relate to the desired layout and appearance of the text, such as whether certain character strings are to be printed in bold, centered, at the top of a new page or screen, etc. In SGML, the elements of the text are marked with "semantic" markers, typically "section heading," "subsection heading," etc. Through a style sheet, these markers are translated into visual features e.g. italics, bold, etc Manufacturers of products of high technical complexity, such as computers, copiers and printers, factory equipment, etc., must inevitably produce a service manual or "documentation" for their product in order to enable service personnel or technical representatives ("tech reps") to service the systems as necessary. For many decades, a typical organizing principle of documentation, such as for a copier or printer, is to provide a relatively large number of what are in effect flowcharts, or decision trees, for performing diagnostics on the particular machine. Such flowcharts include instructions for setting up a particular test on a particular small portion of the machine and then requiring the human tech rep to answer one or more queries about the test. Typically these queries are in the form of declaratives that the tech rep must answer true or false: if a certain subset of queries elicit "true" responses, then the tech rep will be informed that a particular corrective action should be taken. Other queries may require an answer whether, for example, a certain scalar parameter (temperature, or age of a part) is within one of three or more numerical ranges.

As answers to certain queries lead to other queries in order to obtain a correct or plausible diagnosis, it will be seen that the substance of the documentation for a particular complicated machine or system will be in the form of a large quantity of decision trees, perhaps filling up hundreds of pages, each decision tree relating to very small subsystems within a larger apparatus. Not surprisingly, such documentation can form an unwieldy document which becomes less practically useful as it becomes larger and more comprehensive. It would therefore be desirable to provide a system by which a human tech rep could intelligently access the large number of decision trees in a set of documentation to immediately cut to those few decision trees which are most likely to be relevant to his particular problem.

Documentation which is, in substance, a large number of decision trees is particularly conducive to organization in a hierarchical markup language such as SGML. It is an object of the present invention to provide a system by which documentation in the form of an SGML document can be exploited, by use of facilities already present in SGML, to form a basis for an expert diagnostic system.

An advantage of creating an expert system which can exploit pre-existing SGML documentation is, of course, that the original documentation, which may pre-exist the present invention by many years or decades, does not have to be rewritten for purposes of developing an expert system or even a hypertext document. Another benefit of a system which exploits SGML documentation is that printed documentation need not be authored separately from a computerized system which is viewed, for example, by a tech rep's laptop.

Yet another advantage is that, in many instances, it may be desirable to make the basic documentation, such as would be found on printed pages, publicly available either in printed form, or else through a public system such as the World Wide Web. At the same time, the proprietor of the documentation, namely the manufacturer of the product being serviced, may wish to retain control over certain information which is intertwined with the documentation. Such intertwined information may include statistical data as to which part of a large machine malfunctions most often, cost data for replacement parts, or an inventory of what parts tech reps carry in their vans. In this way, a manufacturer of a complex machine may retain some advantages of making documentation freely available, while retaining a significant quantity of "value added" features which can be exploited only by the manufacturer itself.

SUMMARY OF THE INVENTION

According to one aspect of the present invention, there is provided a viewer for viewing a knowledge base. The knowledge base includes a plurality of markup language elements. Each of a subset of markup language elements in the knowledge base has a markup language tag which identifies the element in the subset as query element, each query element including a query about an observable condition of a physical system. Each of a subset of markup language elements in the knowledge base has a markup language tag which identifies the element in the subset as a corrective action element, each corrective action element being related to a possible way of addressing the condition of a physical system. The markup language elements in the knowledge base are arranged hierarchically in a plurality of decision trees with each query element functioning as a node in a decision tree, with each query element and each corrective action element including an identifying code in the tag thereof. The viewer comprises a list of suspects, each suspect being a name relating to a condition of a physical system. Means are provided for cross-referencing each suspect to at least one query element or corrective action element in the knowledge base, the cross-referencing means identifying elements by the identifying code in the tag thereof. Means are further provided for retrieving from the knowledge base and displaying a cross-referenced markup language element, in response to a user entering a suspect to the viewer.

According to another aspect of the present invention, there is provided a method of authoring a knowledge base in a markup language, the knowledge base comprising a plurality of markup language elements, each element being identifiable by at least one markup language tag. A query tag is associated with each of a plurality of elements in the knowledge base to define query elements, each query element comprising a quantity of prose which instructs a user to make an observation about a physical system. A corrective action tag is associated with each of a plurality of elements in the knowledge base to define corrective action elements, each corrective action element comprising a quantity of prose which instructs a user to perform an action on a physical system. Cross-reference tags are provided to query elements and corrective action elements, to establish relationships among preselected query elements and corrective action elements, whereby each of the plurality of query elements is associated with at least two elements including either a corrective action element or another query element.

BRIEF DESCRIPTION OF THE DRAWINGS

In the drawings:

FIG. 4 is an example of lines of SGML code using specialized tags according to the present invention;

FIG. 6 is a sample page of a printed diagnostic manual as would be used in servicing a printing machine; and FIG. 7 is an example showing the relationship of SGML data with its accompanying text data.

DETAILED DESCRIPTION OF THE INVENTION

The Knowledge Base

Figure 1:
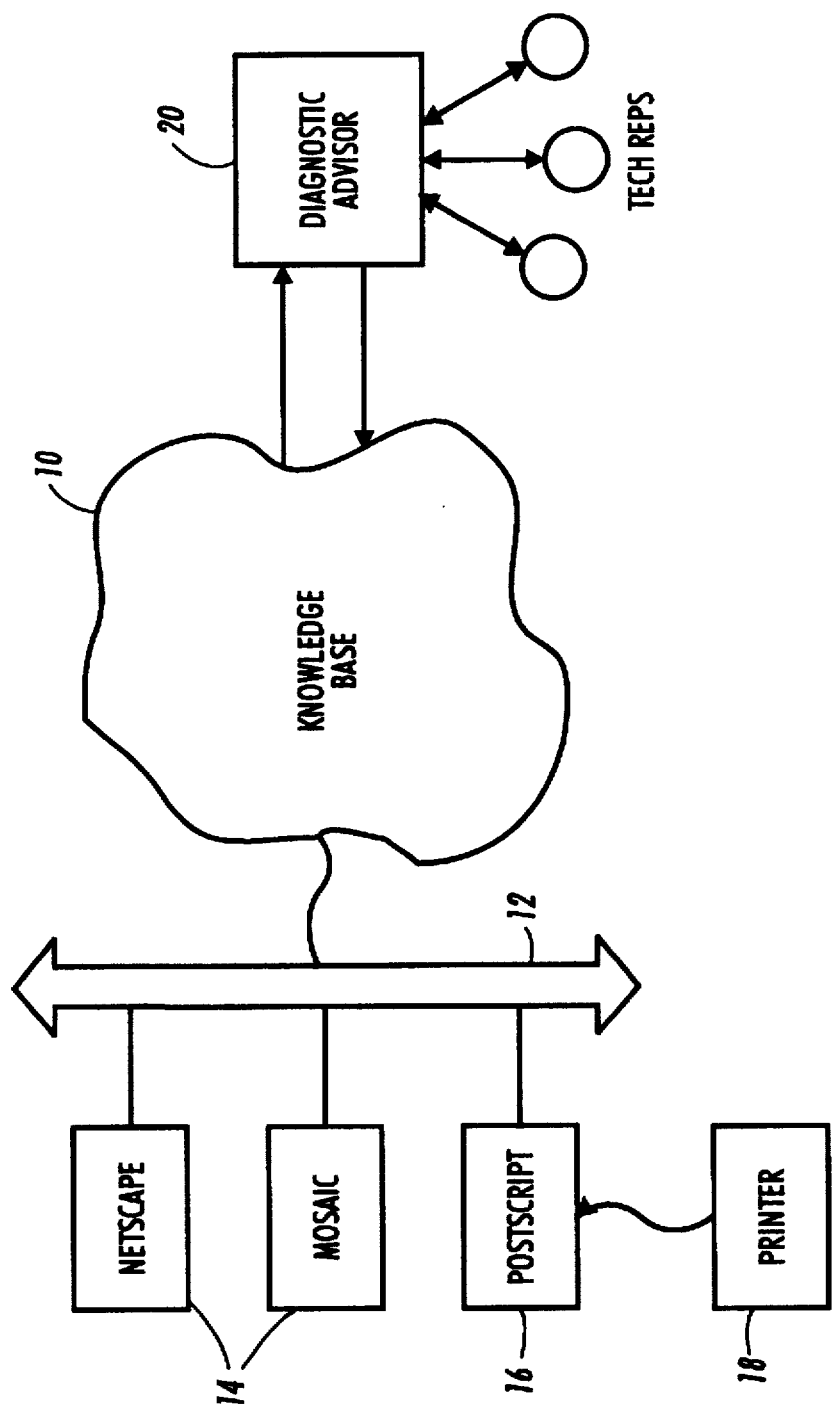
FIG. 1 is a simplified systems view showing a knowledge base and the relationship of passive viewers and a diagnostic advisor thereto.

FIG. 1 illustrates a general overview of the principle of accessing a knowledge base according to the present invention. The knowledge base indicated generally as 10 is a quantity of data which may be resident within a single large computer memory, or be in the form of a system of shared memories among different computers available on a network. Knowledge base 10 is a fixed quantity of data which is for the most part accessible to any authorized party. Further, as will be described in detail below, the knowledge base 10 is preferably in the form of hierarchical or nested data, such as would be found in an SGML rendering of the decision trees forming the documentation of, for example, a large digital printer. As used in the claims herein, such a machine is referred to as a "physical system," which may be a man-made machine, such as a printer, computer, or automobile, but which could also be a naturally-occurring system, such as the human body, if a medical expert system were so designed.

According to the present description, the knowledge base 10 is accessible to two types of users: passive users, which would typically include the general public accessing the knowledge base 10 through a public network, and what will here be called "active users," the function of whom will be described in detail below. FIG. 1 shows that knowledge base 10 may be accessible through a network 12, which may be, for example, the World Wide Web, or another aspect of the Internet. Such a publicly-available network may include users using commercial "browsers" or viewers typical of which are those made by Netscape or Mosaic, as shown by the viewers indicated by 14. Further, there may be on network 12 any number of printer viewers, such as the PostScript viewer 16, which in turn would download to a printer 18. The purpose of a printer viewer is to allow a passive user to download all or part of the knowledge base 10 in printed-document form for printing on a printer such as 18, so that the passive user could conceivably print out his own version of the basic documentation for a particular machine as needed.

In contrast to the passive users on network 12, which is suitable only for commercially-available standard viewers or browsers, there is, according to the present invention, a class of "active users" who access the knowledge base through a medium of a "diagnostic advisor" 20. Diagnostic advisor 20 is, in brief, a specialized type of viewer which has been itself "authored" by a person having direct physical knowledge of the machine being diagnosed by the tech rep. That is, according to the present invention, the diagnostic advisor is more than a mere text-search apparatus but rather incorporates an understanding of the physical reality of the system being diagnosed when choosing what portions of the knowledge base 10 to view under certain conditions. This understanding is manifested in the editorial decisions made by the author of the diagnostic advisor 20, and also in the selection and placement of the markup language "tags," as will be explained below, on elements in the knowledge base 10 which have been selected by the author of the diagnostic advisor as relevant to a particular service situation.

To illustrate the function of diagnostic advisor 20, and its interaction with a hierarchical data base such as knowledge base 10, reference will be made to the following practical example, from which general principles will be derived.

In the case where a tech rep is called upon to service a copier, the tech rep will have a number of initial sources of information for making a diagnosis, such sources being specific to the copier he is servicing, and also information which the tech rep brings to the situation based on his training and previous experience. Very often, many types of mid- and high-volume printers and copiers have an error-code panel on the top of the machine, which will display a specific error code generally directing a tech rep or user to the source of a malfunction. For example, a code "E2" could refer to a paper jam, "C4" could refer to being out of paper, "A3" could refer to an electrical malfunction, etc. This error code displayed by the machine can be the tech rep's first indication as to the source of the malfunction. More sophisticated diagnostic systems, available in some high-end equipment, will output more specific error codes, which can be downloaded directly into the tech rep's own laptop computer. (The indication could also be a directly-observed print quality indication, noted and entered by the tech rep, such as "dark background," etc.) This first indication can be used to direct the tech rep to a particular section of the documentation which is generally relevant to the indicated malfunction. However, in a practical embodiment, this generally relevant portion of the documentation could be a chapter of as many as several hundred printed pages in a service manual.

FIG. 6 shows a sample page of a printed-text service manual such as used to diagnose a high-volume copier. The illustration is given merely to show the flavor of the steps the tech rep is intended to carry out in order to perform a suitable diagnosis given a certain small number of hard facts, such as the error code displayed by the machine. It will be noted that the underlying structure of the procedure illustrated in FIG. 6 is that of a decision tree: every query (bolded sentence) requiring a yes-or-no answer is in effect a node in a decision tree. In the illustrated example, a particular single decision tree is called a "repair analysis procedure," or RAP; there will be hundreds of such RAPs for a typical commercially-available copier or printer. In general the instructions such as shown on the example page in FIG. 6 can be classified in four main ways:

setups, indicated as S, which bring the tech rep's activities into context;

tests, indicated as T, which instruct the tech rep to perform a specific action prefatory to gathering information;

queries, indicated as Q, which are questions resulting from the test T which the tech rep must answer (in the specific embodiment shown, these queries are in the forms of "declaratives" which are intended to have yes or no responses); and corrective actions, indicated as CA, which are recommended "fixes" for the machine which are identified by specific answers to specific queries.

There may be other specific classifications of elements in the printed documentation, such as descriptions (shown as DESC), titles of sections, and warnings (e.g., when the test involves high voltage) but these are not directly relevant to the illustrated embodiment of the present invention.

It will be noted that, even in the printed rendering of a page of documentation as shown in FIG. 6, the different classes of statements (setups, tests, queries, and corrective actions) are suitable for hierarchical organization, which can be expressed as elements within an SGML hierarchy, as will be described in detail below.

The Diagnostic Advisor

Figure 2:
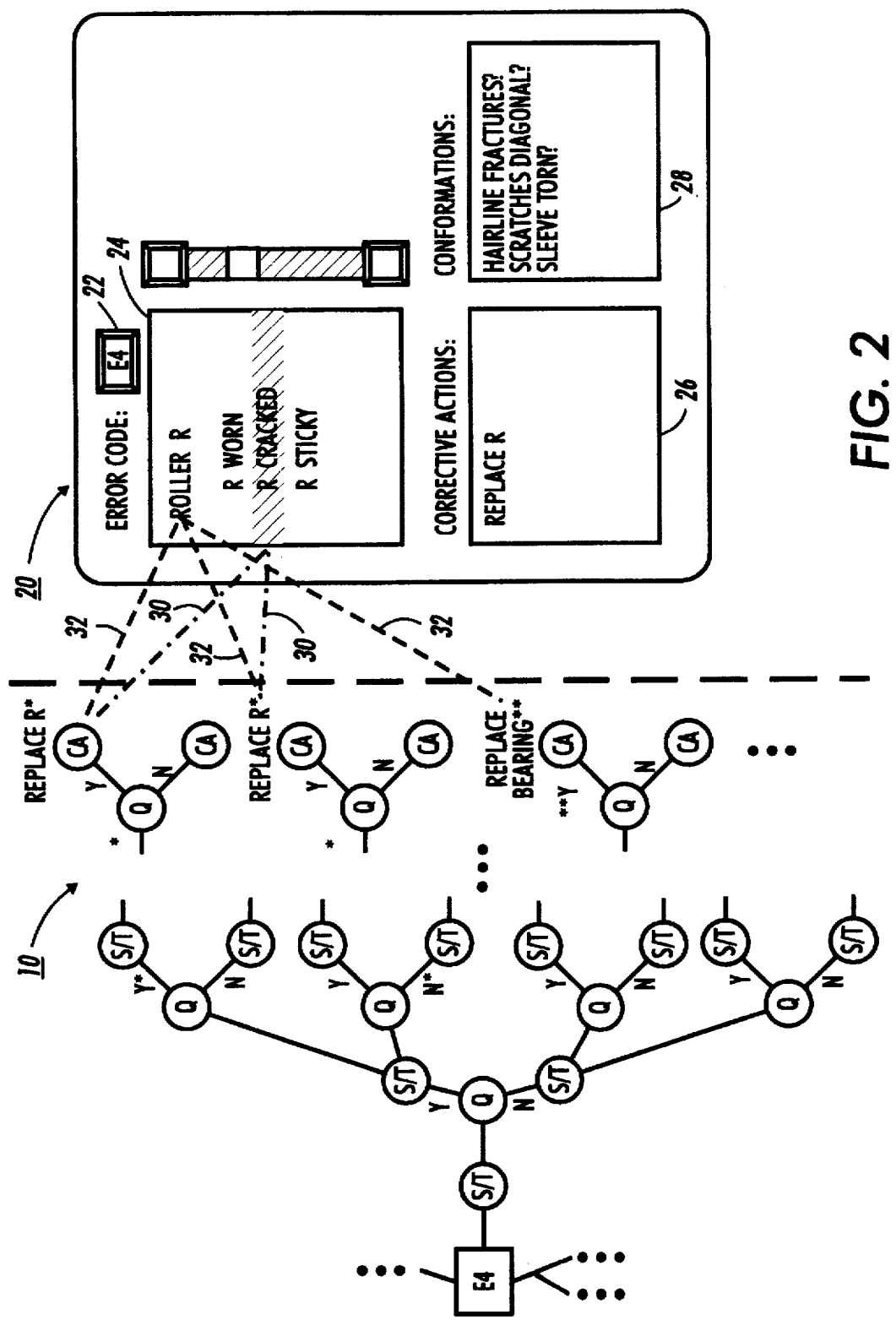
FIG. 2 is a systems diagram showing the interaction of a diagnostic advisor according to the present invention, with nodes of a decision tree in a knowledge base.

FIG. 2 shows, on the left-hand side thereof, a knowledge base 10, such as would be used, for example, in the documentation for a copier. The knowledge base 10 is organized into a multi-layer decision tree which, in substance, is the same as the hundreds of pages of documentation such as shown in FIG. 6 for a typical high-volume copier. As can be seen in FIG. 2, an error code such as E4 (which is one of many which may be displayed by the machine) thus leads to one or more of perhaps many hundreds of decision trees, each decision tree having any number of layers. As illustrated in FIG. 2, given the basic error code such as E4, the relevant documentation includes setups S, tests T, and at least one query Q. Each query Q represents a branch point, or node, in a decision tree, with yes and no (or true and false) alternatives creating branching in the tree. (It is also possible, although not shown in this example, to have a query Q branch off into three or more possible responses, such as yes/no/unknown, or three or more temperature ranges.) Typically, each response to a query Q leads to either another setup and test, indicated as S/T, or, as the "leaves" at the ends of the branches of the decision tree, a particular corrective action, hereshown as CA at the ends of the decision tree. As used in the claims herein, each query Q which creates a branch in the decision tree is referred to as a "node" of the decision tree, while each of the ends of the decision tree is referred to as a "terminal point" of the decision tree. Depending on the particular organization of the knowledge base, the terminal points can be corrective action elements themselves (as shown in this example), or can be diagnosis elements (e.g., "roller R is broken") which refer to corrective action elements (e.g., "replace roller R") elsewhere in the knowledge base.

From the perspective of a tech rep or other person trying to diagnose a malfunction in a particular copier, to start with the very basic input of the F4 error message displayed by the machine, and then to methodically go through every iteration of the diagnostic procedure, would be a very pedestrian and ultimately inefficient process. For various reasons, the author of a printed version of documentation is allowed to assume very little in the way of experience of an individual tech rep or other person trying to repair a copier, and therefore printed documentation must assume more or less complete ignorance on the part of the human reading it. In the real world, however, many tech reps are themselves capable of contributing much more input to the diagnostic process than can be assumed by a printed text. Every experienced tech rep will have some idea of the particular likely problems associated with a particular model of machine. This "soft" expertise of individual tech reps is garnered from being able to view the copier directly and see, hear, and smell what is going on within it. The diagnostic advisor 20 enables a human tech rep to select, based on direct observation of the malfunctioning copier, one or more "suspects" which he believes could be the root cause of the problem. Based on this input, the diagnostic advisor 20 accesses only the relevant portions of the knowledge base 10, and then, from this relatively small amount of data taken from knowledge base 10, synthesizes a proposed repair routine. The diagnostic advisor 20 thus exploits input from the human tech rep to obtain the final desired result (diagnosing and repairing the malfunction) in a manner which makes optimal use of the human observer and the procedures embodied in the knowledge base 10.

Returning to the present example, let us say that, after noting the error code E4 (paper jam) at the top of the machine, the tech rep opens the machine and notices that a quantity of paper has accumulated around some roller, here arbitrarily called roller R, which is somewhere in the machine. The tech rep therefore has additional information that can provide specific guidance regarding the source of the malfunction, in a way that following the decision trees in knowledge base 10 could only arrive at after many iterations through a large number of decision trees. The tech rep, typically accessing diagnostic advisor 20 through, for example, a laptop computer on the site, can enter the phrase "roller R", or even "error code E4, roller R", into the diagnostic advisor 20.

The right-hand side of FIG. 2 shows the function of diagnostic advisor 20, as manifested in a sample user interface. As shown in FIG. 2, there may be provided on the laptop screen a small space 22 for the tech rep to enter the error code, in this case E4, and then a scrollable menu 24, the content of which may be determined by the error code (i.e., different error codes entered at 22 may invoke different contents to the scrollable menu 24). The menu 24 lists possible specific areas of defects, in this case specific areas in which a paper jam could take place. As shown in FIG. 2, the user interface is scrolled to the section involving roller R. Under the general heading of "roller R" are specific defects which may befall roller R. In the present example, if the tech rep notices paper jams around roller R but cannot at this time identify a specific problem with roller R, the tech rep can simply scroll to and select the general "roller R" entry in the menu 24. Alternately, if, upon further examination of roller R, the tech rep can determine the specific problem with roller R, he can scroll to and select a sub-heading under roller R in the menu, such as the "roller R cracked" entry in menu 24, as shown.

When an observation such as "roller R cracked" is invoked by diagnostic advisor 20, diagnostic advisor 20 accesses all of the nodes and/or terminal points in the decision trees of knowledge base 10 that are relevant to the specific observation entered by the tech rep. As mentioned above, this is a more sophisticated operation than a mere text search through the various entries in knowledge base 10; rather, this is a special selection of relevant nodes and terminal points in knowledge base 10, based on the author of the diagnostic advisor's own expertise about the copier. This expertise about the physical system in question should transcend a mere text base search. For example, if the noted problem is "image on page not permanent" there may be many reasons for this condition which would only be apparent to a person having actual physical knowledge of the system. Impermanent images may be caused by (among other things) insufficient heat on a fuser, which in turn may be caused by (among other things) a malfunctioning transformer, which in turn may be caused by (among other things) insufficient ventilation, etc. It is therefore evident that a mere text search would be unsatisfactory in dealing with many diagnoses.

Returning to the present example, if the tech rep examines roller R and determines that it is cracked, he may select the "roller R cracked" item from the menu, which will in turn directly invoke (as a function of diagnostic advisor 20) the suitable corrective action to take if roller R is indeed cracked. As it happens, if roller R is cracked, the only solution is to replace roller R. There is thus provided, on the tech rep's user interface to diagnostic advisor 20, a window for corrective actions, which in this case is only one, "replace roller R". This cross-referencing is shown by the connecting lines 30 in FIG. 2. The relevant nodes and/or terminal points in knowledge base 10 have been determined beforehand by the author of the diagnostic advisor 20, who has appended cross-reference "tags" to the nodes and terminal points in knowledge base 10 which he has deemed relevant, in a manner which will be explained in detail below, based on the author's own expertise about the physical system.

The nodes or terminal points in knowledge base 10 which have been identified as relevant will inevitably include any corrective action which terminates in "replace roller R," since that is indeed the recommended corrective action. However, in order to confirm that roller R is indeed cracked and that replacement is therefore the only solution, the author of the diagnostic advisor 20 may append cross-reference tags, hereshown as asterisks, to enough nodes in the decision tree to enable the tech rep to determine that roller R is indeed cracked and not, for example, merely discolored. Thus, diagnostic advisor 20 will, in brief, present to the tech rep a menu of relevant specific observations the tech rep may have made given a particular error code. Then, in response to a selected observation by the tech rep, the diagnostic advisor 20 retrieves from knowledge base 10 only the relatively small number of portions of decision trees which are relevant to that particular observation.

According to a preferred embodiment of the invention, the user interface further displays, in addition to the corrective actions shown in response to a specific observation entered by the tech rep, a list of confirmations, which are SGML elements which are higher, i.e. more "toward the trunk," within the decision trees of knowledge base 10 than the queries and corrective actions which are originally cross-referenced by the entry of a suspect. To create a suitable confirmation for display, there should be retrieved enough higher-up SGML elements to enable the tech rep to determine that, in the present example, the roller R is indeed cracked. Thus, as shown in FIG. 2, in response to entering the observation "roller R cracked" the diagnostic advisor 20 displays in the "confirmations" window 28 a list of setups, tests, and queries retrieved directly from the knowledge base 10, that are sufficient to show that the tech rep's initial observation is confirmed; typical confirmation queries in this example could include "Are there hairline fractures on roller R?" or "Is roller R discolored?". A confirmation is thus a further reference, from the originally-cross-referenced node or terminal point, that provides enough information to cause the query (node) or corrective action (terminal point) to make sense, and thereby allows the tech rep to confirm or exonerate the entered suspect. As described in the claims herein, this principle is described as retrieving elements which are higher in the decision tree hierarchy than the markup language element relating to the cross-referenced corrective action.

It will be noted that a "blind" set of iterations through the decision trees of knowledge base 10 goes from most general observations (the error code E4, for example) to more and more specific possible diagnoses, and then ends with very specific corrective actions to specific parts: that is, one moves on the tree from the trunk to the branches to the leaves. In contrast, a person using diagnostic advisor 20 has the option of starting the inquiry with a suspect diagnosis and corrective action, and then retrieving from the knowledge base 10 only those portions of the relevant tree which terminate with that suspect diagnosis, so that the suspect diagnosis may be confirmed or exonerated. To continue the metaphor, the diagnostic advisor 20 is capable of moving from the specific to the general, or from the leaves to the branches, of the decision trees.

The importance of this technique, as distinguished from a mere text-search technique, will be apparent in situations in which the tech rep is operating in a field of uncertainty, and must rely on the knowledge base for guidance. For example, if the tech rep examines roller R and determines that it is worn, but may or may not be cracked, an author of the diagnostic advisor 20 may know that a worn roller R may be a result of a defective bearing B on roller R, instead of or in addition to any defect that is inherent to roller R. Therefore, the diagnostic advisor 20, in response to the observation "roller R worn" observation being entered, may invoke those nodes in knowledge base 10 which are relevant to either the roller R or to the bearing B for roller R. A mere text-search viewer, looking for any reference to "roller R" in the knowledge base 10, would not have any physical knowledge of the machine, and would not know that a problem with roller R may be caused by bearing B. Thus, if the tech rep has scrolled to and selected "roller R worn," the diagnostic advisor 20 selects nodes or terminal points within knowledge base 10 that are relevant to either roller R or the bearing B. The different set of cross-references necessitated by a more general suspect is shown by the connecting lines 32 in FIG. 2.

In a more general sense, if the tech rep were even more unsure of the diagnosis, the tech rep could select the general "roller R" item, and in turn the diagnostic advisor would invoke all of the nodes and/or terminal points which are in any way relevant to roller R or are known to be physically associated with roller R (such as motors, transformers, fuses, etc.) in the physical machine. However, the more the tech rep himself can observe about roller R, the faster diagnostic advisor 20 can present the tech rep with a suitably small number of specific tests he can perform to confirm his diagnosis. At the same time, in situations where the tech rep is uncertain from direct observation what the problem is, the tech rep can enter a general suspect, or a number of suspects, and exploit more of the decision trees (i.e., starting from more general observations, "closer to the trunk") to help isolate the problem.

Once the confirmation is displayed to the tech rep, he will answer the questions posed by the displayed query in the confirmation window. Depending on whether he provides a "yes" or "no" answer to the query, there will in turn be displayed the suitable corrective action, or else the particular answer to the query will simply open up the need for another test and query. In other words, to follow the decision tree shown in FIG. 2, some branches of the decision tree will quickly terminate as corrective actions the tech rep can take, while other responses to certain queries will require answering further queries. Thus, when the tech rep enters in the answers to various queries into his laptop, his very answers will cause further nodes, nodes lower in the hierarchy of the decision tree, to be retrieved from knowledge base 10 and displayed. The system of the present invention thus first enables the tech rep to instantly access the most relevant portion of the knowledge base, and then enables the tech rep to navigate through the knowledge base once he is in the right "neighborhood."

As mentioned above, the terminal points of the various decison trees in knowledge base 10 could be themselves markup language elements specifying a corrective action for the tech rep to carry out, e.g. "replace roller R"; or alternately the terminal points can simply be final conclusive diagnoses, e.g, "bearing B is broken", which in turn can be linked to a necessary corrective action (including, optionally, bitmaps of images) stored elsewhere in a memory (which may or may not form part of knowledge base 10). For purposes of the claims hereinbelow, what is important is that each "corrective action element" be associated with, in a broad sense, a corrective action to be performed on the physical system.

An important variation to the present invention is apparent in situations where the selection of a particular observation such as "roller R worn" could invoke two possible corrective actions, as mentioned above, either replace roller R or replace the bearing of roller R. In complicated repair situations, where there are a number of possible corrective actions to be taken, it will be likely that different corrective actions have widely different costs associated therewith. As used herein, the word "costs" could be used in the broad sense, that is, in terms of ordering a part, a time investment by the tech rep, or the necessity to call another expert. Further, the accumulated experience of different tech reps over time may determine that certain very specific malfunctions addressable by different corrective actions (replace the roller R, or replace the bearing B) may have significantly different probabilities as a "best" solution. For example, in the present case, if it has been found that the roller R is worn 90% of the time because of a defective bearing, it may be desirable to replace the bearing. However, if a roller costs $1.00 and a bearing costs $50.00, it may be more profitable to simply keep replacing the roller. Information relevant to these types of decisions may be desired to be kept proprietary, and not to be accessible in knowledge base 10. However, such information can be resident within the diagnostic advisor 20, or manifest in the locations of suitably referenced tags in the knowledge base 10, and would not be apparent to a passive viewer of the documentation in knowledge base 10. Further, such statistical information could in fact be gathered by monitoring, via diagnostic advisor 20, the number of times a large population of tech reps accesses a certain node in the knowledge base 10, as will be described in detail below.

According to one embodiment of the present invention, for every suspect entry made by the tech rep, corrective actions are displayed by the diagnostic advisor 20 in a specific order. This editorial decision on what makes one corrective action cheaper or otherwise better than another is made by multiplying the cost of the corrective action, times the probability that the particular corrective action is the most relevant, such as in the bearing example just given. Once again, the "cost" could be expressed in terms of not only the cost of a new part, but the value of a quantity of labor required to implement the corrective action. Other factors which could be quantified under "cost" may include danger (e.g., whether the tech rep will have to deal with high voltages or charged capacitors) or convenience (e.g., whether the replacement part is easily carried in a van).

Other possible inputs, which in the claims are intended to be covered under the rubric of "cost," for the editorial decisions on the order in which corrective actions are displayed can be entered in ways that are invisible to the tech rep. For example, the age of a particular machine being repaired may have a profound influence on the likelihood of one particular subsystem requiring the tech rep's attention. For example, if a particular machine is less than a month old, it may have been found that defects in the control system of the machine are the most common source of a certain type of malfunction. However, if the same machine is between one month and five years old, it may be known that the most likely source of the same malfunction is a defect in certain mechanical parts of the machine; if the same machine is more than five years old, the most likely source of the malfunction could be the power supply system. This age-dependence of the most likely source of a malfunction could be manifest in the order in which RAP elements are displayed to the tech rep. For a very new machine, in this example, the cross-referenced nodes could be displayed in the order of: control system, mechanical parts, power supply; for the same machine which the diagnostic advisor 20 knows is ten years old, these possible sources of the malfunction could be displayed in the reverse order.

Other considerations which may be relevant for assigning "costs" to particular corrective actions are discussed in the next section.

Synthesizing a Proposed Diagnosis/Repair Procedure

In addition to the function of allowing a tech rep to enter suspects based on the tech rep's own direct observation, the system of the present invention is capable of permitting a tech rep to enter very basic observed conditions of the physical system (in this case, a copier or printer) and then, in response to the entered basic problem, display a selected set of RAPs from the knowledge base 10 which are relevant to the general problem. The mechanism by which a general problem is cross-referenced to the relevant elements in the knowledge base 10 is the same as that described above for cross-referencing "suspects" toward the leaves of the decision trees. However, when entering a general problem into the diagnostic advisor 20, the diagnostic advisor 20 does not necessarily start with corrective actions toward the ends of the decision trees, but rather is more likely to reference more general areas of inquiry (i.e., higher nodes) in the knowledge base.

Figure 3:
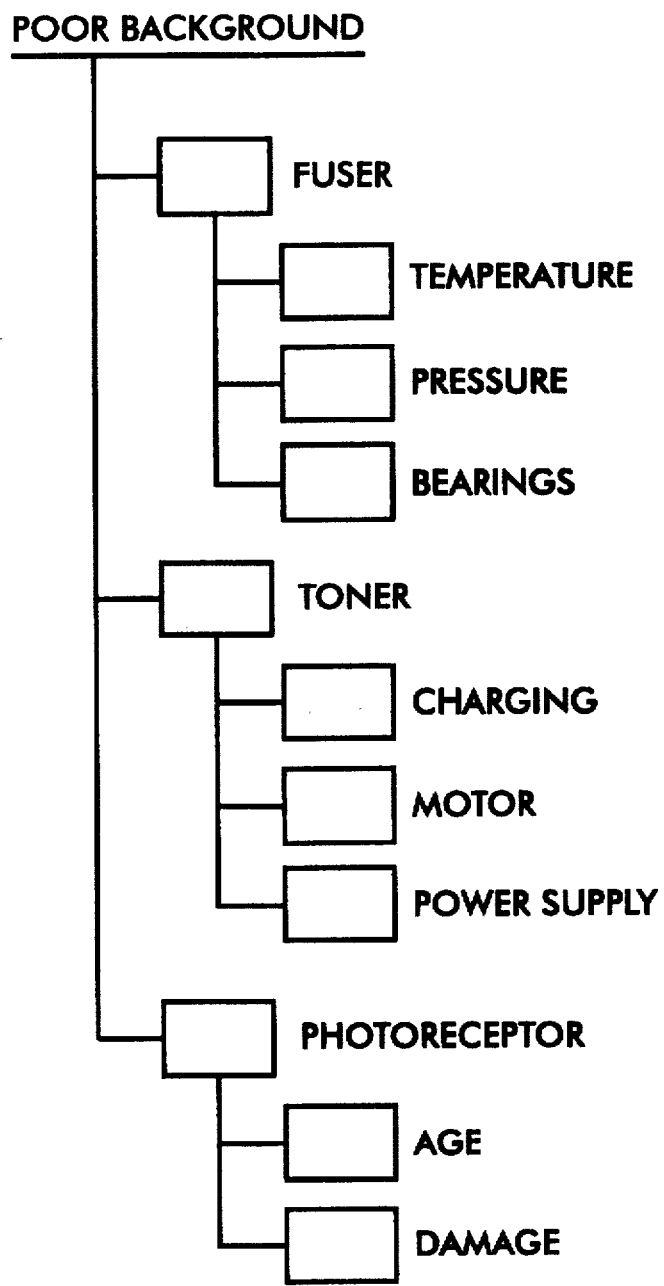
FIG. 3 is an example of a display of a synthesized repair procedure, as derived by a diagnostic advisor according to the present invention.

FIG. 3 shows an example display, as would be presented on a tech rep's laptop by diagnostic advisor 20, of a proposed repair procedure synthsized by diagnostic advisor 20 in response to a general description of a malfunction, such as here described in the reprographic context as "poor background" (i.e., a film of toner is adhering to areas which should be white in the printed documents). This is the type of problem which may have any number of root causes, involving disparate subsystems, in a printing apparatus. As shown in the Figure, these root causes may relate, for example, to the fuser, to the toner, or to the photoreceptor; within each of these general topics there may be further. The editorial decision that these three general areas are relevant to a poor background is made by the author of the diagnostic advisor 20: while it may be evident that individual large sections of the documentation such as relating specifically to the fuser, toner, and photoreceptor separately, it would not be directly evident from reading the knowledge base 10 that the same final malfunction (poor background) may be caused by one of these three otherwise separate subsystems. It is a mark of the "value added" of the diagnostic advisor 20 to recognize that disparate subsystems may be possible causes of the same final malfunction.

As shown in the Figure, there is displayed, according to a preferred embodiment of the invention, a hierarchy of document elements, each document element being labeled as relating to a different subsystem, and containing those elements retrieved from the knowledge base 10 defining RAPs (i.e. decision trees) which the author of the diagnostic advisor 20 has identified as being possibly relevant to the problem of "poor background." The particular order in which the illustrated files are displayed on the tech rep's laptop can be made representative of an editorial decision relating to the "cost" of the corrective actions therein; using of course the word "cost" in the very broad senses described above.

As illustrated in the Figure, the author of the diagnostic advisor 20 in this example, has selected the fuser as the most likely source of the particular background problem, followed by the toner and the photoreceptor. It is also to be expected that, within each document element retrieved by diagnostic advisor 20, the elements forming the RAPs are similarly chosen in order of probability of success. (However, it is also possible to intermix RAPs from different subsystems, so that one need not exhaust the fuser RAPs before going on to the toner RAPs, as here illustrated.) Taken together, the files of RAPs shown in FIG. 3, should the tech rep decide to pursue them in the order in which they are displayed, represents an entire proposed diagnostic procedure which will in turn address each of the displayed subsystems. The order of the subsystems and the RAPs therein is representative of an order of RAPs which is expected to fix the entered problem most efficiently, taking into account the cost and probability of success of each RAP.

From the perspective of an author of a diagnostic advisor 20, creation of a synthesized diagnostic/repair procedure such as shown in FIG. 3 involves deciding, given a general description of a malfunction, which RAPs are most likely to be useful, and programming the diagnostic advisor to make these "costing" decisions when determining what order to display the relevant RAPs for the most likely shortest path to success. The rules by which one set of RAPs are displayed before another can be static, e.g. given the problem "poor background," the editor of diagnostic advisor 20 may decide that the fuser should always be checked first. Alternately, this type of editorial decision could be made dynamically; e.g. a system could monitor which RAPs are used most in the real world by a population of tech reps, and then use this statistical data to prioritize the usefulness of RAPs, on the theory that the RAPs which are used the most are most useful. Combinations of static and dynamic prioritizing of RAPs in synthesizing diagnostic procedures will be apparent.

As part of the "costing" method and means recited in various claims hereinbelow, there may be provided means for accepting additional forms of information which can be made relevant to a determination of what order to display RAPs in a proposed diagnostic procedure under various conditions. Taking into account the time taken by a particular corrective action, the availability of a part, and/or the age of a particular machine being serviced have been mentioned above. Other parameters which a costing means may take into account include:

"Customer profile": With printing and copying machines, different customers using specific machines may differ in terms of their customer preferences, and this preferences can impact an optimal course of action for a tech rep. For example, a lawfirm may place a high premium on perfectly pristine copies, and so it may be important that a tech rep sevicing a copier in a lawfirm take extra steps to ensure extremely high copy quality. At the same time, a user of a copier in factory may care little about perfect copies, but require an absolute minimum of down time; relative to the lawfirm situation, the tech rep's priority is to "fix" the copier as quickly as possible, even at the expense of perfect copy quality. These competing customer demands can be reflected in the optimal repair procedure selected by diagnostic advisor 20: if the tech rep enters the serial number of the machine being serviced, the diagnostic advisor may recognize the type of customer using that machine, and tailor the repair procedure accordingly.

"Operating environment": The diagnostic advisor 20 may also take into account the physical environment of a machine being serviced, and thereby emphasize RAPs directed to subsystems which are vulnerable to particular environmental situations. For example, the fact a copier is located in a dusty environment such as a warehouse, or a humid environment such as a loading dock, may cause a large number of malfunctions in the charging subsystem. The time of year may also be a relevant consideration. Also, in some parts of the world, the voltage and current of commercial electricity may not be consistent over time. All of these environmental factors will tend to make certain subsystems more likely sources of "suspects" than others under different conditions.

"Repair history": Certain individually-identifiable machines in a population may have distinct repair histories which can affect the selection of RAPs. The fact that a particular machine has had, for example, its entire development system replaced in the last year may cause RAPs relevant to the development system to be placed on either a very low or very high priority (depending on the implementation) in the proposed repair procedure.

The diagnostic advisor 20, when selecting the order of RAPs under specific conditions, may take into account the various cost considerations such as time of repair, availability of parts, age of machine, customer profile, operating environment, and repair history under any of various types of algorithms, such as a point-count system. The "points" associated with a cost (in any sense) of particular corrective action in the knowledge base can be retained in the diagnostic advisor 20 itself, or stored within an SGML tag within knowledge base 10. For example, in addition to the SGML tag associated with a corrective action stating, as illustrated above, the time of a particular corrective action in minutes, other information in the tag could be recognized by diagnostic advisor 20 as meaning "common in machines less than one year old," "not useful if copy-quality requirements are low," "common in high-dust environments," etc. Such special circumstances can contribute to adding or substracting prioirty points in a prioritizing algorithm. Sophisticated prioritizing techniques, such as employing fuzzy logic, may be used in conjunction with a point-count system as well.

An important practical advantage of the display of a synthesized proposed procedure such as in FIG. 3 is that the display progressively displays to the tech rep an abstracted view of the synthesized proposed repair procedure in the form of a suspect hierarchy, in a way which intuitively conveys the diagnsotic advisor's strategy and which acts as a navigational aid for diagnosis.

It will be seen that a tech rep using diagnostic advisor 20 can navigate the various decisions trees of knowledge base 10 in two directions: first, a tech rep could enter a suspect in the form of a very specific part which appears to be malfunctioning (such as "roller R") and then cause the diagnostic advisor to cross-reference elements in knowledge base 10, moving from the corrective actions to more general confirmations (that is, move from the leaves of a decision tree to the branches). Alternately, the tech rep could enter very general observations (such as "poor background") and have the diagnostic advisor 20 cross-reference very general (close to the "trunk") elements in the knowledge base 10, thus allowing the tech rep to navigate from the general to the specific within knowledge base 10.

According to a practical embodiment of the present invention, the relevant elements within the knowledge base are accessed and retrieved by diagnostic advisor 20 at a distinct "compilation time" when the tech rep enters a particular suspect or general principle. When a suspect toward the leaves of the tree is entered, it is typical that only enough higher level elements need be retrieved from knowledge base 10 in order to form confirmations of the malfunctioning suspect. If a general observation such as "poor background" is entered, however, it is likely that all of the elements "downward" from a very general observation in a number of decision trees (such as covering different subsystems) will have to be retrieved from knowledge base 10 and compiled in diagnostic advisor 20. It is thus evident that the entering of general observations will require the diagnostic advisor to retrieve, in typical situations, significantly more elements from knowledge base 10 than would be the case if the tech rep entered a suspect in the form of a specific part.

In the claims, the entry of a "suspect" which in turn causes the referencing of elements within the knowledge base, can be construed as a suspect either in a specific form or as a general observation. In other words, entering a general observation such as "poor background" is functionally the same as entering a "suspect" such as roller R, although entering a general observation will cause much more elements to be retrieved. However, for purposes of the claims, a general observation could count as a "suspect."

Implementation in SGML Documents

As mentioned above, a useful practical embodiment for rendering a knowledge base such as 10 is SGML, a known system for organizing data hierarchically. It is well known in the art to use SGML to preserve the integrity of the logical appearance of text when it is displayed or printed. For example, if a certain quantity of data is either displayed on a screen or printed, whatever the configuration of the words of the text on the screen or page, it is desirable that certain rules be followed, such as titles are of a different appearance than the rest of the text; new paragraphs always begin on a new line; and new chapters always begin at the top of new page. In order to preserve this integrity, SGML provides a system whereby extra information, relating to the appearance of the text, is in effect overlaid on the basic information forming the data. FIG. 7 gives an example of the text of a document, with its additional instructions, shown in shaded form, by which the text is rendered as an SGML element. The sample of text shown in FIG. 6 is overlaid with a "document type definition" or DTD, in the form of tags appearing before and after each set of words forming, for example, a paragraph. Looking at FIG. 7, it can be seen that each paragraph begins with the tag "PARA" and ends with "/PARA" (i.e, end of paragraph). Similarly, as can be seen, the title is indicated as TITLE, and emphasized portions are indicated as EMPH. In a physical manifestation of such an SGML document, the characters of the text will typically be in the form of ASCII code, and each of the tags forming the DTD will be in the form of specific ASCII codes. However, in most situations were the document is printed or displayed, the tags will of course not appear. These tags which influence the appearance of a document when it is dispayed or printed are here referred to as "formatting" tags.

When an SGML document is displayed or printed by a particular apparatus, it is an attribute of the SGML standard that the particular physical apparatus will simply ignore any tags it does not understand. The display or printing apparatus will take the ASCII character as characters to be displayed, and take codes it recognizes as DTD tags as instructions for formatting the characters.

According to a preferred embodiment of the present invention, the cross-referencing system by which the diagnostic advisor 20 accesses specific elements of the knowledge base 10 can be carried out by means of specialized SGML tags. Whereas typical SGML tags are directed only to instructions as to the appearance of the text on a page or a screen, with the system of the present invention, additional SGML tags are applied to suitable SGML elements within the knowledge base 10 so that the identified elements can be retrieved when a particular suspect is entered into the diagnostic advisor 20, as shown in FIG. 2 above. FIG. 4 shows a simple example of the "raw" SGML documentation of a small portion of knowledge base 10. It can be seen by the tags (shown in the angled brackets), that in addition to SGML "formatting" tags which relate to the appearance of a document, such as /PARA, there are also provided tags which identify each SGML element (such as a simple sequence of words) by its logical relationship with one of the hierarchical decision trees within knowledge base 10. For example, at the top of the example set of codes in FIG. 4, there is shown in the first set of angled brackets the word TEST, and, after the phrase "Check that the tray 1 home latch locks the tray in the home position," the tag /TEST, which indicates that that particular SGML element is over. The quoted passage between the tags is the phrase that will be displayed on the tech rep's laptop.

Significantly, in the first set of angled brackets indicating the beginning of this particular SGML element, there is provided further information within the angled brackets of the TEST tag. In particular, along with the indication that the following line of code is characterized as a test, there is a variable declaration TIME=2.0 [minutes], meaning that 2.0 minutes are required for the tech rep to perform this test. This declaration is included as part of a cost function which can be retrieved by diagnostic advisor 20, and used to calculate the cost of performing this particular test.

Further, the particular test is assigned an identification number here declared as ID=R07001/5. The purpose of this ID number is to provide a unique identification, or "hook," to this particular test within the knowledge base 10. When a particular suspect entered into the diagnostic advisor 20 is cross-referenced to this particular test, the diagnostic advisor 20 will have, at the relevant portion thereof, this particular ID number, so that this particular test will be retrieved from knowledge base 10.

It will also be noted that, in the angled brackets of the TEST tag, there is also a reference to a set-up, identified as SETUP=R07001/4 (not shown in the Figure) which must also be displayed in order for the line given as the test to make sense. Thus, every time this TEST tag is referenced, such as in confirmation window 28 in FIG. 2, the SETUP element above it is displayed as well. Similarly, when a corrective action is cross-referenced by the diagnostic advisor, it is necessary that the corrective action also reference the query that led to it, which in turn will reference the test above it. In this way, the total RAP of setup, test, query, and corrective action will be displayed in a manner coherent to the tech rep. This display of the RAP thus serves as the confirmation of whether the suspect entered by the tech rep was correct.

In the illustrated embodiment, what has been described above as "queries," that is inquiries that the tech rep must make of the machine, are called "declaratives" because they require a true or false answer. Thus, in the example of FIG. 4, the query, requiring a true or false answer, of "The tray 1 home latch locked tray 1 in the home position" is identified as a declarative or DECL. Further, as will be noted, this declarative/query is given the identification number of R07001/6. With the set-up indicated as SETUP, it will be apparent how these extra SGML tags enable a document advisor 20 not only to identify particular nodes desired to be accessed from the knowledge base, but also provide some extra information, particularly in terms of time, which can be exploited by the diagnostic advisor 20 in determining which corrective actions are most likely to be useful.

When the tech rep enters into his laptop the answers to the queries displayed to him such as in the confirmation window 28, as mentioned above, his answer will either cause a corrective action to be displayed, or else will require a further query, which is the inherent nature of decision trees. It will be apparent that the entry of a yes or no answer to a particular query will in turn cause the diagnostic advisor 20 to navigate the knowledge base 10 by causing the diagnostic advisor 20 to retrieve, depending on a particular answer to a particular query, the next-lower SGML element in the decision tree of knowledge base 10: selecting "yes" to a query will invoke one tag, and selecting "no" will invoke another tag. It will be evident that this navigation through the decision tree can be carried out by means of reference to identification numbers placed around the relevant SGML elements. Also, each new query referenced by a higher query in the hierarchy will typically be preceded by setup and test SGML elements, to give a context to the query.

Significantly, comparing the decision-tree structure of the example SGML document of FIG. 4 with the printed-out format shown in FIG. 7, it will be clear that the new SGML tags required to enable the present invention can be readily grafted onto a pre-existing SGML document. A printed-out document is after all most likely to be originally written in an SGML format, so that adapting the pre-existing printable knowledge base for use in the present invention involves merely placing these specialized tags at appropriate places in the original SGML document. As mentioned above, because it is an attribute of SGML that a viewer will ignore tags that it does not understand, a passive viewer, such as accessing the document through the Internet, will not be able to exploit these special tags. In this way, while a passive viewer or printer may be able to access all of the substance of knowledge base 10, a user having diagnostic advisor 20 will be able to access the same data base in a more efficient and intelligent fashion.

Figure 5:
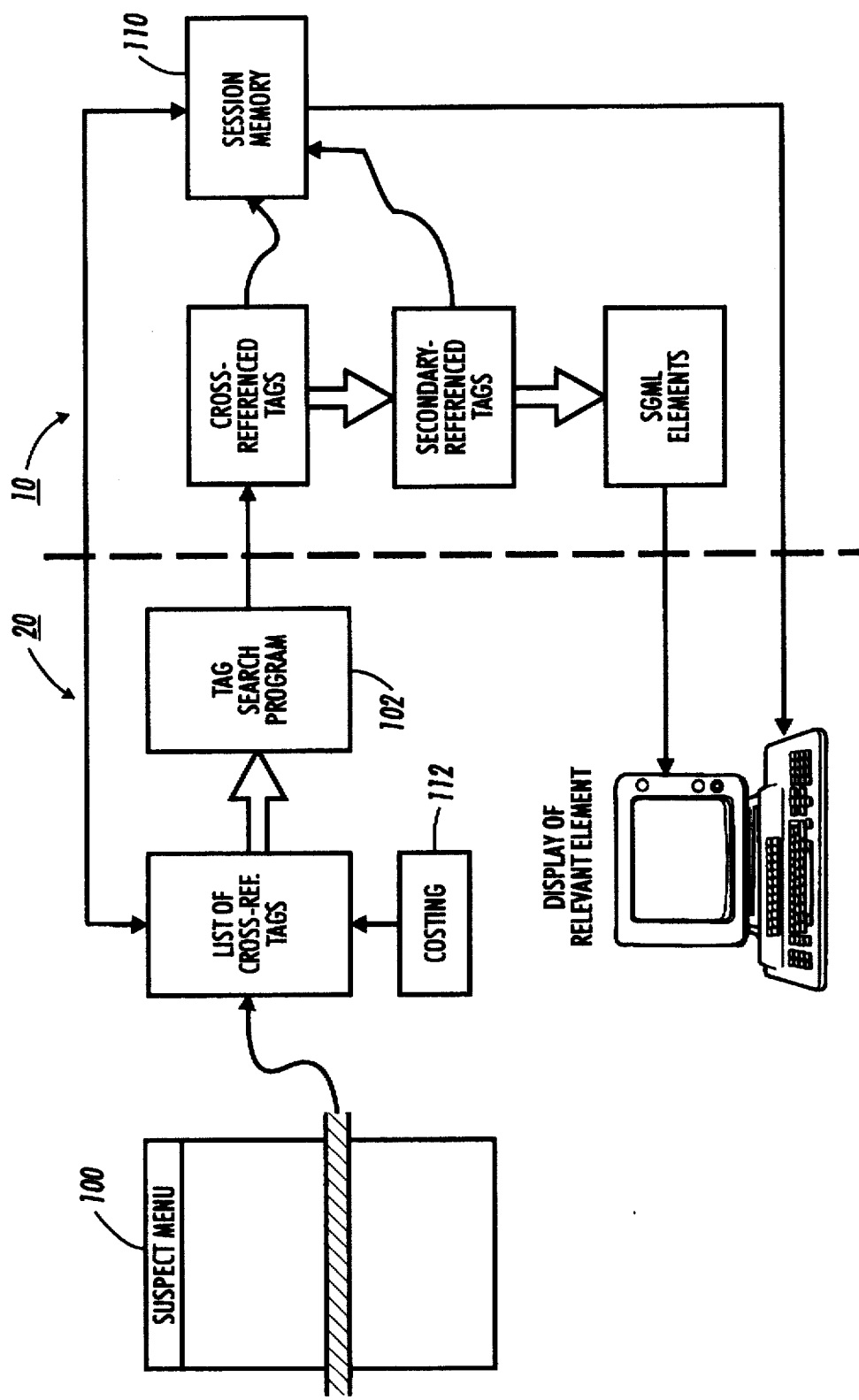
FIG. 5 is a systems view showing the basic elements of a viewer/diagonstic advisor according to the present invention, and its interaction with a knowledge base.

FIG. 5 gives a general overview of the interaction, in an SGML element-retrieval sense, of the interaction between diagnostic advisor 20 and the knowledge base 10. The "point of entry" for the user using the diagnostic advisor 20 is the suspect menu 24. As mentioned above, a tech rep scrolls to the desired entry in the suspect menu where he believes a malfunction is occurring. Each suspect listed in the suspect menu, when it is selected, releases a list of the cross-referenced tags that the author of the diagnostic advisor 20 has deemed to be relevant to that particular selected suspect. The tags are then submitted to a tag search program 102, of a software design known in the art, which goes into the SGML document that is knowledge base 10, searches the entire knowledge base 10 for those cross-referenced tags. Once again, it should be noted that, in this search, the search program 102 is not looking at the actual text that is the substance of the knowledge base 10, but rather is searching through the SGML tags, which would not be apparent in the printed-out version of knowledge base 10. However, once the desired tags are located in the knowledge base 10, what is retrieved and displayed is the text itself.

As shown for example in the sample code of FIG. 4, each SGML element identified by diagnostic advisor 20 may itself be cross-referenced to other SGML elements: every identified query should refer back to a test, and very often every identified test should refer back to a setup, etc. In this way, when the different SGML elements are retrieved, the displayed SGML elements will be shown in a coherent form, that is, as a setup, followed by a test, followed by a query, followed in turn by a corrective action. To display a query by itself, for example, may cause the retrieved SGML elements to be incoherent when displayed. However, in the preferred embodiment of the present invention, entered suspects are referenced to confirmation expressions and corrective actions in knowledge base 10; confirmation expressions in turn reference queries, which in turn reference tests, which reference setups. Elements directly referenced by the diagnostic advisor 20, and secondarily-referenced SGML elements, are referenced by the originally-referenced tags, as shown in the FIG. 4 example, where referencing a test causes the test to further reference a setup above it.

At the same time, once the tech rep receives a query on his lap top and answers the query with a yes or no answer, that answer to the query will cause a cross-reference to either another query, or to a corrective action. In terms of retrieving SGML elements from knowledge base 10, in responding to a query, the tech rep will in turn cross-reference further SGML elements in order to move toward the "leaves" of the decision tree.

Important Variations

An important aspect of the present invention, when dealing with large amounts of documentation in knowledge base 10, is that a test performed on a particular small part of a machine such as a copier may be applicable to two disparate trees within the entire documentation. For example, assume that, in a particular machine, both the fuser and a paper feed motor are part of a common electrical subsystem, which in turn includes a fuse F1. Typically, a problem like smudging of an image on a sheet would be associated with improper operation of the fuser, whereas a defect such as crimping of the sheet would be associated with improper operation of the feed motor. Because the two largely independent subsystems share a common fuse, it is likely that a query such as "Are the terminals of fuse F1 corroded?" would be found in the trees associated with either subsystem in the knowledge base; i.e. the same query will appear in completely different sections of the documentation, hundreds of pages apart in the printed version. A tech rep who is uncertain of the essential nature of a malfunction may be likely to enter as suspects entries relating to the feed motor, the fuser, and any other subsystem.

Since the query about the terminals of fuse F1 need only be answered once, it is desirable that this query, and any other query which has applicability to multiple decision trees addressing different subsystems, be given the same identification number regardless of the context in which it appears. Thus, no matter how the tech rep arrived at the query about the terminals of fuse F1, once this query has been answered, the answer to this query can be retained in a memory associated with the diagnostic advisor 20. In this way, should the tech rep investigate the feed motor first, and then investigate the fuser, the fact that the particular common fuse F1 has already been checked can aid the tech rep in narrowing down the problem with the fuser, by ruling out any nodes in the decision tree which involve the fuse F1. The diagnostic advisor 20 can thus include a provision whereby a record of the answer to every query in the session is kept, and, in the course of a session, if a particular query comes up again, it can be automatically answered by reference to the record. More generally, it may be desirable for the convenience of the tech rep to have the diagnostic advisor 20 maintain a running record of all queries which have been answered in the course of a particular session. In FIG. 5 is shown a session memory 110, which keeps a record of what SGML elements have been already referenced in a session.

In sophisticated versions of the present invention, the session memory 110 can further be provided as a device which can display "exonerations" which have come up in the course of the tech rep navigating the knowledge base 10. In other words, an author of the diagnostic advisor may know that certain sets of answers to certain queries will have the effect not of isolating the source of a malfunction, but rather enable the tech rep to rule out a particular suspected type of malfunction. There therefore could be provided a separate window, displayed to the tech rep, a running list of malfunctions which have been ruled out by the tech rep's previous responses to various queries. These exonerations could be in the form displayable phrases, such as "main electrical supply OK," displayed directly by the diagnostic advisor in response to a recognizable set of answers to a particular set of queries retrieved from the knowledge base 10.

Also shown in FIG. 5 is a "costing" module indicated as 112. This costing module represents software which is used to prioritize the retreived RAPs according to costing information and algorithms which may be supplied by either the knowledge base 10 or from a memory associated only with the diagnostic advisor 20. Once again, this "costing" can include both the cost of performing a particular RAP, and also take into account the probability of success of a given RAP.

A helpful addition to the basic system of the present invention is to exploit any hypertext links within the knowledge base 10. For example, for every corrective action in knowledge base 10, it may be desirable to display bitmaps of, for example, exploded views of the part of the machine being serviced to appear whenever the corrective action is displayed, even for passive users not using the diagnostic advisor 20. These bitmaps may be displayed via hypertext links through techniques known in the art. Since such diagrams are typically authored with printed documentation, the bitmaps are often easily obtained.

Finally, the diagnostic advisor 20, being in the hands of a special class of active users, can be used as a medium of communication among users in this class. That is, a tech rep using this diagnostic advisor, and in effect sharing its resources, can be provided with means to create "tip sheets" relating to specific portions of the knowledge base which are often traversed by a large number of tech reps. There could be provided, in a user-friendly form, a technique where once a particular tech rep is "located" at a particular portion of the knowledge base 10, he may want to place a note to other users of the diagnostic advisor 20 for future reference. This note left by the particular tech rep can be activated every time the most closely related SGML element in the knowledge base 10 is activated in the course of a repair procedure.

Further, active users such as tech reps can contribute to the diagnostic advisor 20 in more passive ways, such as by providing a system whereby the diagnostic advisor maintains a statistical analysis of how often certain nodes in the knowledge base 10 are addressed by a large population of tech reps. Such historical information may be of interest not only to the tech reps themselves, in determining which problems are most common with a particular machine, but could also alert the manufacturer of the machine to particular reliability problems.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A viewer for viewing a knowledge base, the knowledge base including a plurality of markup language elements, each of a subset of markup language elements in the knowledge base having a markup language tag which identifies the element in the subset as query element, each query element including a query about an observable condition of a physical system, each of a subset of markup language elements in the knowledge base having a markup language tag which identifies the element in the subset as a corrective action element, each corrective action element being related to a possible way of addressing the condition of a physical system, the markup language elements in the knowledge base being arranged hierarchically in a plurality of decision trees with each query element functioning as a node in a decision tree, each query element and each corrective action element including an identifying code in the tag thereof, comprising:

a list of suspects, each suspect being a name relating to a condition of a physical system;

means for cross-referencing each suspect to at least one query element or corrective action element in the knowledge base, said cross-referencing means identifying elements by the identifying code in the tag thereof; and means for retrieving from the knowledge base and displaying, in response to a user entering a suspect to the viewer, a cross-referenced markup language element.

2. The viewer of claim 1, the retrieving means further including means for retrieving from the knowledge base and displaying, for a cross-referenced markup language element, a higher markup language element relating to a node in the decision tree higher than the markup language element relating to the cross-referenced element.

3. The viewer of claim 2, the higher markup language element being a query element, with the cross-referenced element being related to one possible response to the query element.

4. The viewer of claim 1, the retrieving means further including means for retrieving, with each retrieved query element, a test markup language element giving an instruction to perform a test on the physical system.

5. The viewer of claim 1, the retrieving means further including means for retrieving from the knowledge base and displaying, in response to a user entering one suspect to the viewer, a plurality of corrective action elements.

6. The viewer of claim 1, wherein a corrective action element includes information about a cost associated with the corrective action, and further comprising costing means for accessing information about a cost related to each corrective action element retrieved from the knowledge base, and determining a cost of the corrective action.

7. The viewer of claim 6, the costing means further comprising means for retaining the information about a cost related to each corrective action retrieved from the knowledge base.

8. The viewer of claim 6, the costing means further comprising means for determining, for each corrective action element retrieved from the knowledge base, a priority of the corrective action, based on a cost related to the corrective action and a probability of success related to the corrective action.

9. The viewer of claim 6, the costing means further comprising means for determining a cost associated with a corrective action retrieved from the knowledge base, based on a customer profile of a particular physical system being serviced.

10. The viewer of claim 6, the costing means further comprising means for determining a cost associated with a corrective action retrieved from the knowledge base, based on an operating environment of a particular physical system being serviced.

11. The viewer of claim 6, the costing means further comprising means for determining a cost associated with a corrective action retrieved from the knowledge base, based on a repair history of a particular physical system being serviced.

12. The viewer of claim 1, the knowledge base comprising a plurality of decision trees, at least two decision trees including a functionally identical corrective action element, and wherein the cross-referencing means is configured so that at least one suspect, when entered into the viewer, cross-references the corrective action element in both decision trees and causes retrieval of a query element in each decision tree higher than the markup language element relating to the cross-referenced corrective action.

13. The viewer of claim 1, the knowledge base comprising a plurality of decision trees, at least a first decision tree and a second decision tree including a functionally identical query element, and further comprising means for recording an answer supplied by the user in response to displaying a query from a first decision tree, and applying said answer to the identical query element in a second decision tree.

14. A method of authoring a knowledge base in a markup language, the knowledge base comprising a plurality of markup language elements, each element being identifiable by at least one markup language tag, comprising the steps of:

associating a query tag with each of a plurality of elements in the knowledge base to define query elements, each query element comprising a quantity of prose which instructs a user to make an observation about a physical system;

associating a corrective action tag with each of a plurality of elements in the knowledge base to define corrective action elements, each corrective action element comprising a quantity of prose which instructs a user to perform an action on a physical system;

providing cross-reference tags to query elements and corrective action elements, to establish relationships among preselected query elements and corrective action elements, whereby each of the plurality of query elements is associated with at least two elements including either a corrective action element or another query element.

15. The method of claim 14, further comprising the step of associating markup language formatting tags to elements in the knowledge base.

16. The method of claim 14, further comprising the step of associating a test tag with each of a plurality of elements in the knowledge base to define test elements, each test element comprising a quantity of prose which instructs a user to perform a test on a physical system;

providing cross-reference tags to establish relationships among preselected test elements and query elements, whereby each of the plurality of test elements is associated with a query element which instructs the user to make an observation about a physical system following the test performed according to the test element.

17. The method of claim 14, further comprising the step of providing, for a relationship between a first query element and a second query element, a cross-reference tag referencing a test element comprising a quantity of prose which instructs a user to perform a test on a physical system in response to a possible response to the first query element, and wherein the second query element instructs the user to make an observation about the physical system following the test performed according to the test element.

18. The method of claim 14, further comprising the step of providing, with a corrective-action tag associated with a corrective action element, cost information relating to a cost of performing the corrective action described in the corrective action element.

19. The method of claim 14, wherein the cost information relates to an estimated time of performing the corrective action described in the corrective action element.

* * * * *